May 19, 1936. H. T. KRAFT 2,041,356
METHOD OF MAKING RESILIENT MATTING
Filed Sept. 27, 1934 2 Sheets-Sheet 1
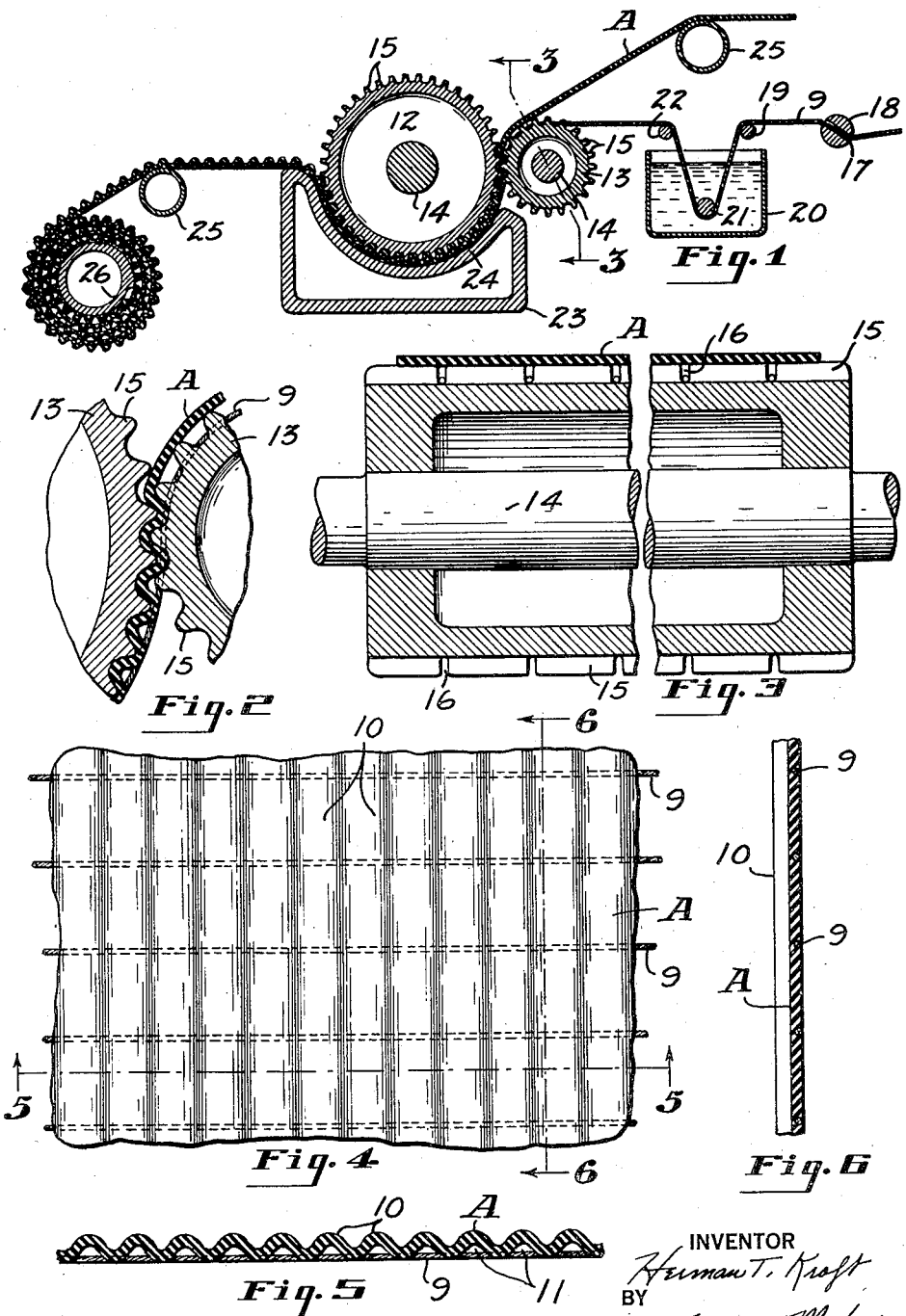

May 19, 1936.  H. T. KRAFT  2,041,356
METHOD OF MAKING RESILIENT MATTING
Filed Sept. 27, 1934  2 Sheets-Sheet 2
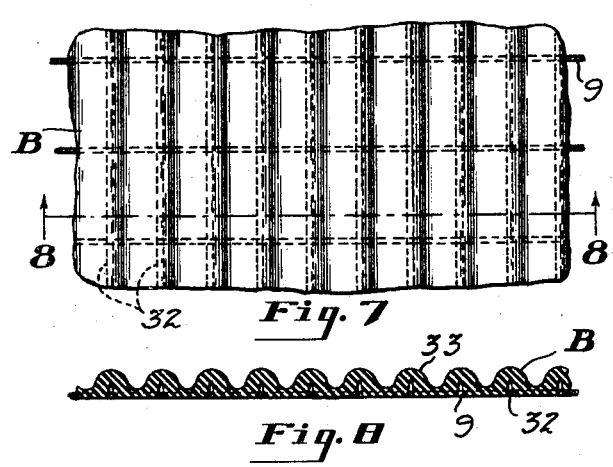
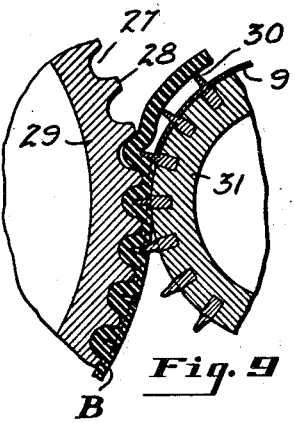
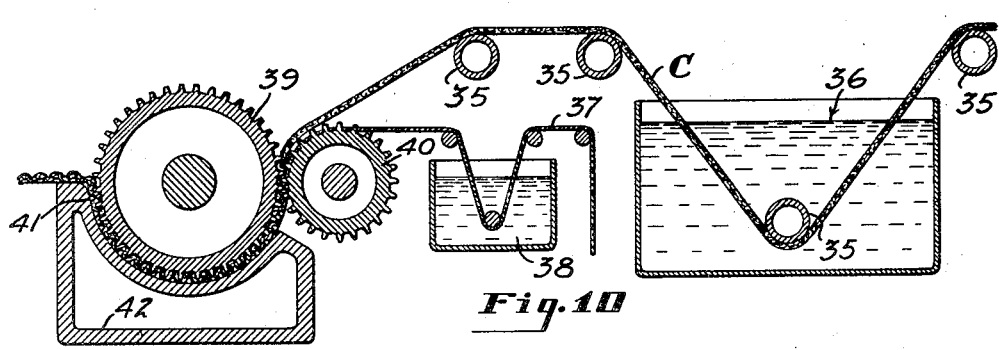
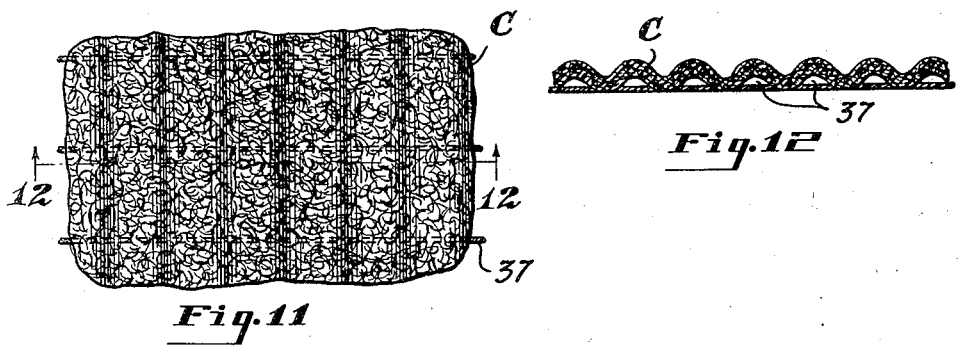
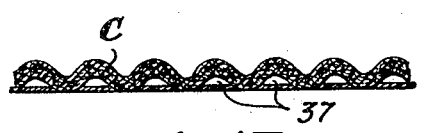
INVENTOR
Herman T Kraft
BY Evans & McCoy
ATTORNEYS Patented May 19, 1936

2,041,356

UNITED STATES PATENT OFFICE 2,041,356

METHOD OF MAKING RESILIENT MATTING

Herman T. Kraft, Akron, Ohio, assignor to The General Tire & Rubber Company, Akron, Ohio, a corporation of Ohio Application September 27, 1934, Serial No. 745,684

6 Claims. (Cl. 154—2)

This invention relates to matting and to a method of and apparatus for manufacturing the same.

One of the objects of the present invention is to provide an improved matting which is lighter in weight and more economical to manufacture and yet is more flexible and more resilient than mattings heretofore known.

Another object is to provide an improved matting which is resilient and which in use will retain its resiliency.

Another object is to provide a new method by means of which flexible and resilient matting can be easily and economically produced.

A further object is to provide new and improved apparatus for manufacturing resilient matting.

With the above and other objects in view the present invention consists in certain features and procedure to be hereinafter described with reference to the accompanying drawings and then claimed.

In the drawings:

Figure 1 is a diagrammatic view showing the apparatus in the process of producing the matting of the present invention;

Fig. 2 is an enlarged fragmentary section through the matting forming drums;

Fig. 3 is an enlarged section taken approximately on line 3—3 of Figure 1;

Fig. 4 is a fragmentary bottom plan view of the matting;

Fig. 5 is a section of the matting taken approximately on line 5—5 of Fig. 4;

Fig. 6 is a section of the matting taken approximately on line 6—6 of Fig. 4;

Fig. 7 is a fragmentary top plan view of a modified form of the matting;

Fig. 8 is a section of the matting taken approximately on line 8—8 of Fig. 7;

Fig. 9 is a fragmentary section of the forming drums used in the production of the matting shown in Figs. 7 and 8;

Fig. 10 is a diagrammatic view showing the apparatus for making a matting composed of loose fibrous material;

Fig. 11 is a fragmentary bottom plan view of the fibrous matting; and

Fig. 12 is a section taken approximately on line 12—12 of Fig. 11.

Referring to the accompanying drawings, in which like numerals refer to like parts throughout the several views, the matting A shown in Figs. 4, 5 and 6 is of sinuous shape in longitudinal cross section as shown in Fig. 5 and is preferably made from rubber, although other resilient materials may be used, and is produced in the case of rubber from uncured sheets of rubber. The lower side of the matting A is provided with a plurality of parallel longitudinally extending cords 9 or the like, which are embedded in the depending rib-like portions 10 to span the spaces 11 therebetween. This is done prior to the curing of the rubber so that the cords 9 will be securely embedded in the portions 10, whereby in the finished article the cords 9 will prevent stretching of the matting and permit it to retain its resiliency.

Heretofore in the making of ribbed rubber matting, it has been the practice to mold or otherwise form the same with ribs or corrugations on the one side only, the other side being flat. Such matting, however, is not very resilient because of the solid ribs or corrugations. In the matting of the present invention, the ribs in effect are hollow and provide for a greater degree of resiliency. Furthermore, the matting of the present invention is of lesser weight because a less amount of material is required and this results in a lower material cost. A greater degree of flexibility is caused by the sinuous cross sectional shape of the matting which permits the matting to be easily handled in convenient rolls.

In producing the matting described, uncured rubber is fed from a roll or strip between a pair of rotatable rolls 12 and 13 mounted on suitable mandrels 14. The rolls are provided with teeth 15 which interfit with a clearance corresponding to the thickness of the matting to be produced. As shown in Fig. 3, the roll 13 is provided with a plurality of spaced circumferentially arranged grooves 16 which extend to the bases of the teeth 15 thereof. These grooves receive the cords 9 which are embedded in the depending ribs 10 of the matting A. The cords 9 are conducted from suitable sources of supply through opening 17 in a rotatable guide and spacer bar 18 and then over rollers 19 downwardly into a container 20 having liquid cement therein, and under a roller 21. From here, the cords pass over guide rollers 22 to the grooves 16 of the drum 13. During the passage of the cords 9 through the bath they absorb and become saturated with the cement.

Mounted below the drum 12 is a heater 23 having an arcuate face 24 which is disposed relatively close to the drum 12 and which serves as an ironer shoe for curing the matting.

Upon rotation of the drums 12 and 13 the uncured matting sheet A is drawn from its source of supply over a suitable guide roller 25 by the interfitting teeth 15 which causes the material to take the form of the teeth and at the same time the cement coated cords 9 which lie within the grooves 16 are pressed into those portions of the material which lie against the tips of the teeth of the roll 12. The adjustable guide and spacer bar 18 is so positioned that the openings 17 thereof are disposed at an angle with respect to the path of cord travel so that the frictional engagement of the cords 9 with the opposed sides of the ends of the openings 17 will maintain a slight tension on the cords 9. The tension can be increased or decreased by rotating the bar 18 in the proper direction to change the angle of the openings 17.

As the formed matting with the cords 9 embedded therein moves with the drum 12, the heater 23 by reason of its close proximity to the matting, cures and vulcanizes the matting, the cords 9 becoming firmly embedded in position. The formed matting is conducted over the edge of the heater 24, over a guide roller 25, and may be wound into a roll on a suitable drum 26.

In the matting B shown in Figs. 7 and 8, a similar method of producing the same is employed, but in this construction the bottoms of the spaces 27 between the teeth 28 of the larger drum 29 are formed to a semi-circular shape, and the teeth 30 of the smaller drum 31 are narrow in thickness so that on the under side of the matting relatively narrow recesses 32 are provided within the ribs 33 on the upper side of the matting. In this construction, however, as in the previously described construction, the cords 9 are vulcanized within the matting to prevent stretching, whereby the resiliency provided by the recessed ribs will be maintained.

In Figs. 11 and 12 I have shown a matting C formed of loosely arranged fibrous material, such as sisal, and which is suitable for use between a rug and the floor and for many other uses. Substantially the same process is employed, but in this case the sisal or other material is passed about a series of rollers 35 which conducts the same through a bath 36 of liquid latex or liquid cement, which causes the sisal to be impregnated with vulcanizable material. The cords 37, as in the previous case, are treated with liquid cement in a bath 38 containing the same.

The matting forming drums 39 and 40 are of substantially the same character as the previously described drums 12 and 13 and during the forming operation form the sisal to a sinuous shape in longitudinal cross section and at the same time force the cords 37 into the under side of the matting, and as the matting with its assembled cords move past the ironing surface 41 of the heater 42 the latex or cement absorbed by the matting fibers and the cement absorbed by the cords 37 is cured.

The cords 37 prevent substantial stretching of the matting since they are vulcanized thereto and thereby act as a means which permits the matting to retain its resiliency.

In each of the mattings described the upper surface is provided with transversely extending corrugations each of which is in effect hollow on its lower side, the hollow space being bridged by longitudinally extending cords that prevent flattening of the ribs.

As previously mentioned, a matting of this character is much more flexible than previously described mattings and is softer and provides a better cushioning effect by reason of the formation of the corrugations or ribs which renders them more resilient. Also, less material is needed for forming the matting which makes it of less weight, and the method of forming the same from flat sheets reduces the cost of production.

Furthermore, it is to be understood that the particular form of product shown and described, and the particular procedure set forth, are presented for purposes of explanation and illustration and that various modifications of said product and procedure can be made without departing from my invention as defined in the appended claims.

What I claim is:

1. The method of forming ribbed matting which comprises forming a series of spaced ribs at opposite sides of the matting and at the same time embedding relatively inextensible elements in the ribs at one side to bridge the spaces between the ribs at one side, and vulcanizing the assembled matting and inextensible elements.

2. The method of forming ribbed matting from a sheet of rubber material which comprises forming a series of spaced ribs at opposite sides of the matting and at the same time embedding relatively inextensible cord-like elements in the ribs at one side to bridge the spaces between the ribs at one side, and curing the assembled matting and elements to vulcanize the same.

3. The method of forming ribbed matting from a sheet of rubber material which comprises progressively forming a series of parallel spaced ribs at opposite sides of the matting and simultaneously embedding a series of cord-like elements in the ribs at one side to bridge the spaces therebetween, and then curing the matting to securely anchor the elements in said ribs.

4. The method of forming ribbed matting from a sheet of rubber which comprises simultaneously feeding the material and a series of cord-like elements, progressively forming parallel spaced ribs in the sheet transversely and at opposite sides thereof and at the same time embedding the cord-like elements in the ribs at one side, and curing the matting.

5. The method of forming matting having spaced ribs from a sheet of rubber and a series of cord-like elements extending transversely of the ribs to bridge the spaces therebetween which comprises progressively feeding the sheet and passing the elements through a vulcanizable liquid to adjacent positions, progressively forming parallel spaced ribs in opposite sides of the sheet and simultaneously while holding the elements under tension embedding the elements in the ribs at one side, and then curing the matting to bond the rubber and elements together.

6. The method of forming matting from a sheet of fibrous material which comprises feeding the sheet through a vulcanizable liquid, feeding a series of cords through a vulcanizable liquid, conducting the sheet and cords to adjacent contacting positions, progressively forming a series of spaced parallel ribs in opposite sides of the sheet and simultaneously bringing the cords into intimate contact with one series of ribs to bridge the spaces therebetween, and then vulcanizing the matting to hold the cords in position.

HERMAN T. KRAFT.